UNITED STATES PATENT OFFICE.

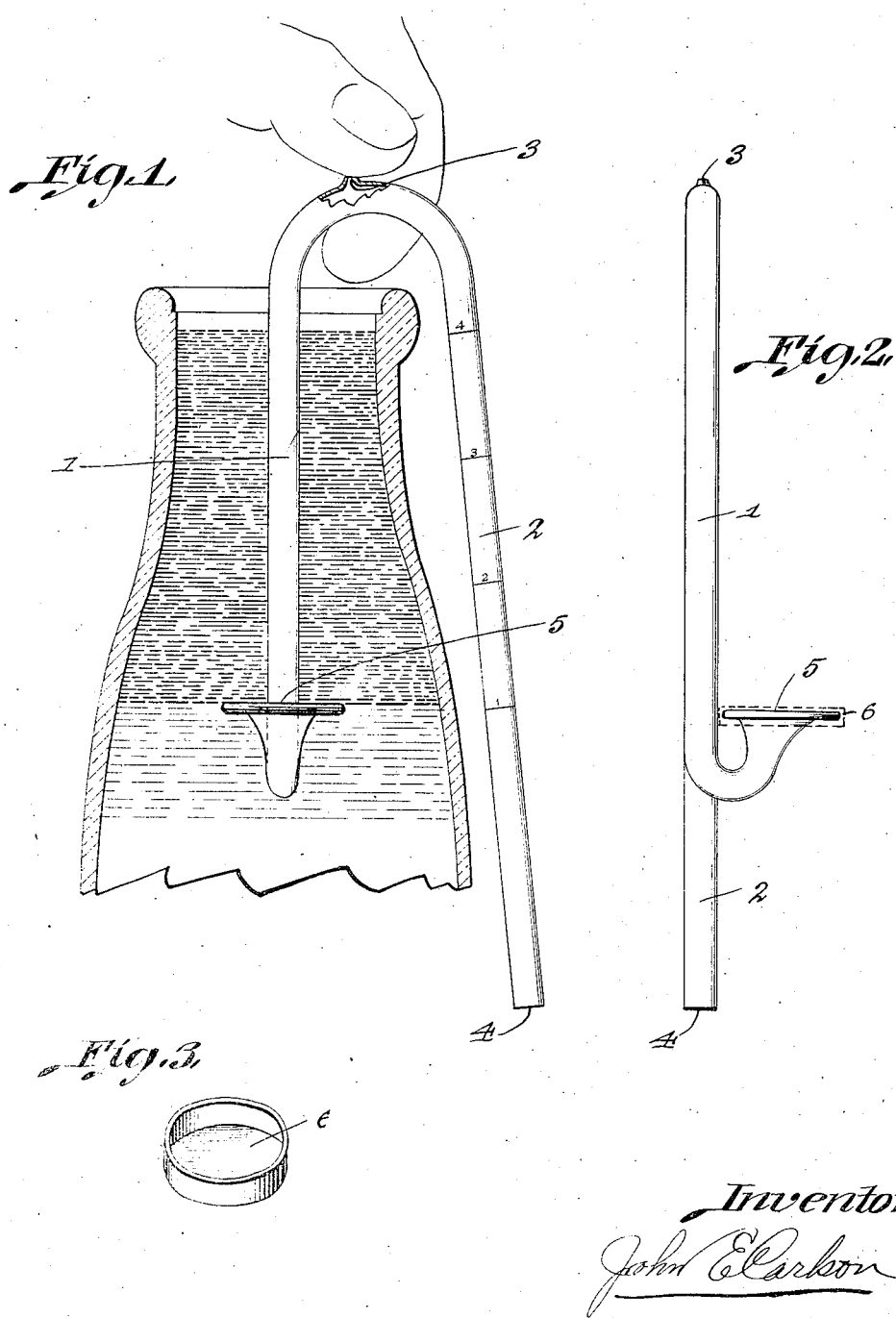

JOHN E. CARLSON, OF HARTFORD, CONNECTICUT.

CREAM-EXTRACTOR.

1,308,928.   Specification of Letters Patent.   Patented July 8, 1919.

Application filed February 6, 1919. Serial No. 275,351.

*To all whom it may concern:*

Be it known that I, JOHN E. CARLSON, a citizen of the United States, and resident of Hartford, county of Hartford, Connecticut, have invented a new and useful Improvement in Cream-Extractors, of which the following is a specification.

The object of this invention is: To extract the cream from a bottle of milk or can, or to separate other liquids of different specific gravity, or to transfer liquid from one container to another.

Referring to the accompanying drawing:

Figure 1 shows the instrument inserted in a bottle.

Fig. 2 gives a side view showing intake cup 2 at right angle for convenience in operation.

Fig. 3 shows a cap, which lies flat on the projecting rim of cup 5.

The instrument consists of a tube, preferably of glass, bent in a U-shape with a short and a long leg, 1 being the intake and 2 the discharge leg, the length of leg 2 extending below leg 1 so as to have gravity enough to cause the flow. The intake 5 is used first for the purpose of filling the tube; second, it serves to prevent undersuction by causing the flow downward from the top of the liquid; and third, when the model becomes too large to be operated by the hand, the cap 6 or any similar member that will lie flat on the projecting rim 5 may be used by first filling the bend at the cup 5 with liquid and placing the cap 6 over the same, to assist in retaining the liquid with which the leg 2 is to be filled by inserting the leg in the manner to be described.

3 is an opening or vent which allows the tube to be filled in the bottle.

To fill the siphon, first, insert leg 2 into the bottle, preferably holding leg 1 by the thumb and second finger; second, close openings 3 and 5, preferably with first and third fingers of the same hand, or if necessary use the cap to close the opening 5. This vacuum retains the liquid in leg 2 while taken out of the bottle. Third, close the opening 4 and support the siphon, preferably with the other hand. Fourth, release and submerge leg 1, the vent 3 allowing the air to pass out of the leg 1 as the liquid rises in said leg and by holding the instrument at the bend by the first finger, as shown in the drawing, close the vent or opening 3 with the thumb and release leg 4.

This starts a free rapid flow which becomes less rapid as the cream is lowered to the milk line. The intake 5 should be placed about two-thirds down into the cream and gradually lowered to the milk line, thus extracting the pure cream.

In a milk can where the cream line is not visible, leg 3 with graduation marks thereon serves as a cream gage. In this case the long leg of the siphon should be placed in the can before the milk has settled and the cream will then stand in the tube to the same depth as in the can and when the tube is removed in the process of starting the siphon, the depth can be read by means of the graduation marks.

From the foregoing specification, it can be readily seen that the possibilities of my invention will not be limited to the milk bottle but includes such variations as come within the scope of my invention and that would naturally suggest themselves to a skilled mechanic.

Having thus described my invention what I claim as new and desire to secure by Letters Patent is:—

1. A device for siphoning liquid from a container comprising a U-shaped tube having a short and a long leg and said tube having a vent opening at the bend whereby the siphon may be primed by the successive insertion of the long leg and the short leg, in the liquid in the container and the proper regulation of the vent and of the ends of the siphon.

2. A device for siphoning liquid from a container comprising a U-shaped tube having a short and a long leg, the end of short leg being turned upward and having a horizontally projecting rim and said tube having a vent opening at the bend, whereby the siphon may be primed by the successive insertion of the long leg, and the short leg in the liquid in the container and the proper regulation of the vent and of the ends of the siphon.

3. A device for siphoning liquid from a container comprising a U-shaped tube having a short and a long leg, the end of the short leg being turned upward and a cap closing said upturned end, and said tube having a vent opening at the bend whereby the siphon may be primed by the successive insertion of the long leg and the short leg in the liquid in the container and the proper regulation of the vent and of the ends of the siphon.

4. A device for separating liquids of different specific gravity, comprising a U-shaped tube having a long and a short leg and a vent opening at the bend, the long leg having graduation marks thereon to indicate the depth of the lighter liquid when this leg is filled in the process of starting the siphon as described.

In testimony whereof I affix my signature.

JOHN E. CARLSON.